United States Patent
Licht

(10) Patent No.: US 10,865,129 B2
(45) Date of Patent: Dec. 15, 2020

(54) PHYTOREMEDIATION TREATMENT SYSTEM AND CONTAINERIZED METHOD OF TREATING POLLUTANTS IN WATER

(71) Applicant: Louis A. Licht, North Liberty, IA (US)

(72) Inventor: Louis A. Licht, North Liberty, IA (US)

( * ) Notice: Subject to any disclaimer, the term of this patent is extended or adjusted under 35 U.S.C. 154(b) by 0 days.

(21) Appl. No.: 16/291,321

(22) Filed: Mar. 4, 2019

(65) Prior Publication Data
US 2020/0283316 A1    Sep. 10, 2020

(51) Int. Cl.
| | | |
|---|---|---|
| C02F 3/32 | (2006.01) | |
| C02F 1/00 | (2006.01) | |
| C02F 1/28 | (2006.01) | |
| C02F 101/30 | (2006.01) | |

(52) U.S. Cl.
CPC ............... *C02F 3/32* (2013.01); *C02F 1/001* (2013.01); *C02F 1/281* (2013.01); *C02F 1/283* (2013.01); *C02F 2101/30* (2013.01); *C02F 2305/06* (2013.01)

(58) Field of Classification Search
CPC .. C02F 3/32; C02F 1/281; C02F 1/001; C02F 1/283; C02F 2305/06; C02F 2101/30
USPC ........................................ 210/602, 616, 617
See application file for complete search history.

(56) References Cited

U.S. PATENT DOCUMENTS

| | | | | |
|---|---|---|---|---|
| 9,162,169 | B1* | 10/2015 | Stivers | B01D 35/28 |
| 2003/0036619 | A1* | 2/2003 | Chrisman | G05B 13/021 |
| | | | | 526/348.2 |
| 2005/0082222 | A1* | 4/2005 | Austin | C02F 3/302 |
| | | | | 210/602 |
| 2012/0091057 | A1* | 4/2012 | Kent | C02F 3/10 |
| | | | | 210/602 |
| 2013/0276370 | A1* | 10/2013 | Licht | A01G 7/00 |
| | | | | 47/66.7 |

FOREIGN PATENT DOCUMENTS

WO     WO 2010/044115 A1 *   4/2010

\* cited by examiner

*Primary Examiner* — Fred Prince
(74) *Attorney, Agent, or Firm* — McKee, Voorhees & Sease, PLC

(57) ABSTRACT

A scalable and moveable phytoremediation cell and system that uses perlite medium surrounding a poplar or willow tree root zone in a cell that results in excellent organic and mineral pollutant treatment. COC removal is achieved by pollutant sorption, increased microbial mineralization activity, fluctuating redox potential, and achieving faster break down of pollutants to achieve regulated water quality standards. The cell reactor system uses photosynthesis and rhizosphere dynamics to create a predictable reactor into carbon-rich microbial biomass mass to remove waste water pollutants (COC). The cell uses <10% of the energy required for alternative tertiary treatment system.

18 Claims, 5 Drawing Sheets
(3 of 5 Drawing Sheet(s) Filed in Color)

PHYTOREMEDIATION TREATMENT SYSTEM AND CONTAINERIZED METHOD OF TREATING POLLUTANTS IN WATER

FIELD OF THE INVENTION

The present invention relates to a process for the treatment of water and, more specifically, to the removal of Contaminants of Concern (COC) in water referred to here as "COC" water using a Phytoremediation reaction cell. COC among others include phosphates and ammonia, BOD organics, *E. coli* and related pathogens, petrochemicals and chlorinated organics.

BACKGROUND OF THE INVENTION

Over the years there has arisen increasing concern on the part of scientists, environmentalists, and the general public as to the condition of our environment, and the adverse impact that humans have had upon it. Some of this concern has been directed toward the destruction of forests and trees which provide oxygen for our atmosphere, and toward the introduction of environmental pollutants, especially those entering surface water and ground aquifers that eventually supply drinking water. Pollutants can be from point sources, like a pipe, or they can be non-point sources such as runoff from urban streets or diffuse leakage from soil. COC in waste water regulated by the 1972 Federal Water Pollution Control Act Public Law 92-500 and drinking water regulated in the and the 197 Safe Drinking Water Act PL 93-523. Water quality standards for ammonia-N, Biological Oxygen Demand (BOD) and pathogens have become stricter since original passage of these laws. Tertiary treatment to achieve modern legal discharge levels has become difficult and expensive, especially for small communities.

The most commonly used method of removing such pollutants is to treat the water at treatment lagoons before it is released to waters of the state as dictated by a National Pollutant Discharge Elimination System (NPDES) permit.

In accord with the present invention the root zone rhizosphere of the removal cells or containerized system develop a predictable COC removal capacity. Natural processes are driven by photosynthesis creating carbohydrates and amino acids which travel to roots for new growth and exudation through root surfaces to adjacent soil. Microbes adopt and thrive on these exudates as their primary carbon energy source and impact the rhizosphere physical and chemical properties. The microbes can thus remove COC as a secondary carbon and nutrient source, and their rates can be measured and predicted.

A clear linkage is made between the Gulf of Mexico Hypoxia dead zone and the U.S.A. Midwest nutrient leakage into the Mississippi River. Waste water discharged to waters-of-the state by all U.S. communities must reach lower ammonia-nitrogen concentrations and lower *E. coli* pathogen counts. This is an urgent issue in the Midwest but also is of concern nationwide. Starting in 1988, research showed that poplar roots could be grown in trenches to remove>95% nitrate-nitrate in shallow groundwater seeping into drainage ditches from upgradient cornfields. Conceptual research showing rhizosphere reactions specifically for nitrate and ammonia nitrogen removal began for this inventor when pursuing his Ph.D. in environmental engineering at The University of Iowa. This research culminated in U.S. Pat. Nos. 5,947,041 and 6,250,237 both titled "Method for Using Tree Crops as Pollutant Control", both of which are incorporated herein by reference. These patents related to pollutant control principally using Salicaceae family trees (*Populus* spp. and Salix spp.). The phytoremediation (hereinafter referred to as "Phyto") concept of these patents was utilized for cleaning petrochemicals, fertilizer nutrients and soluble minerals from groundwater using fixed position plants planted into soil, which are not moveable and scalable units.

By moveable and scalable units, one means non-fixed position decontamination units or removal cells that can be used, and if needed easily moved; and which can also be 'scaled" by using in parallel to expand reactor total capacity. Such units have clear and apparent advantages over fixed position unitary (non-scalable) devices, such as lagoons and field planted tree buffers.

There was and remains a continuing need for moveable and scalable units for phytoremediation which offer numerous advantages over simple, strategic fixed position plantings of my prior patents. This invention addresses this need, among others.

SUMMARY OF THE INVENTION

Phyto cells, where a cell is a containerized unit of controllable rhizosphere engineered to remove COC in water, were experimented with for field research. Early units tested variables such as media, flow rates, tree varieties, removal efficiency and chemistry. The culmination of this experience has shown tree roots growing predictably in Perlite (chemical definition is Sodium Potassium Aluminum Silicate—(CAS #93763-70-3). Perlite is natural volcanic glass composed of amorphous silica that is very stable under normal operating conditions for the unit. Trees growing in this perlite media removes ammonia nitrogen, BODs, and pathogens at high rates from a waste water influent. In some embodiments of the present invention, a scalable cell comprises a containerized perlite media interwoven with roots of Salicaceae cuttings dispersed throughout the entire media as a pollution control.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE INVENTION

Figure 1:
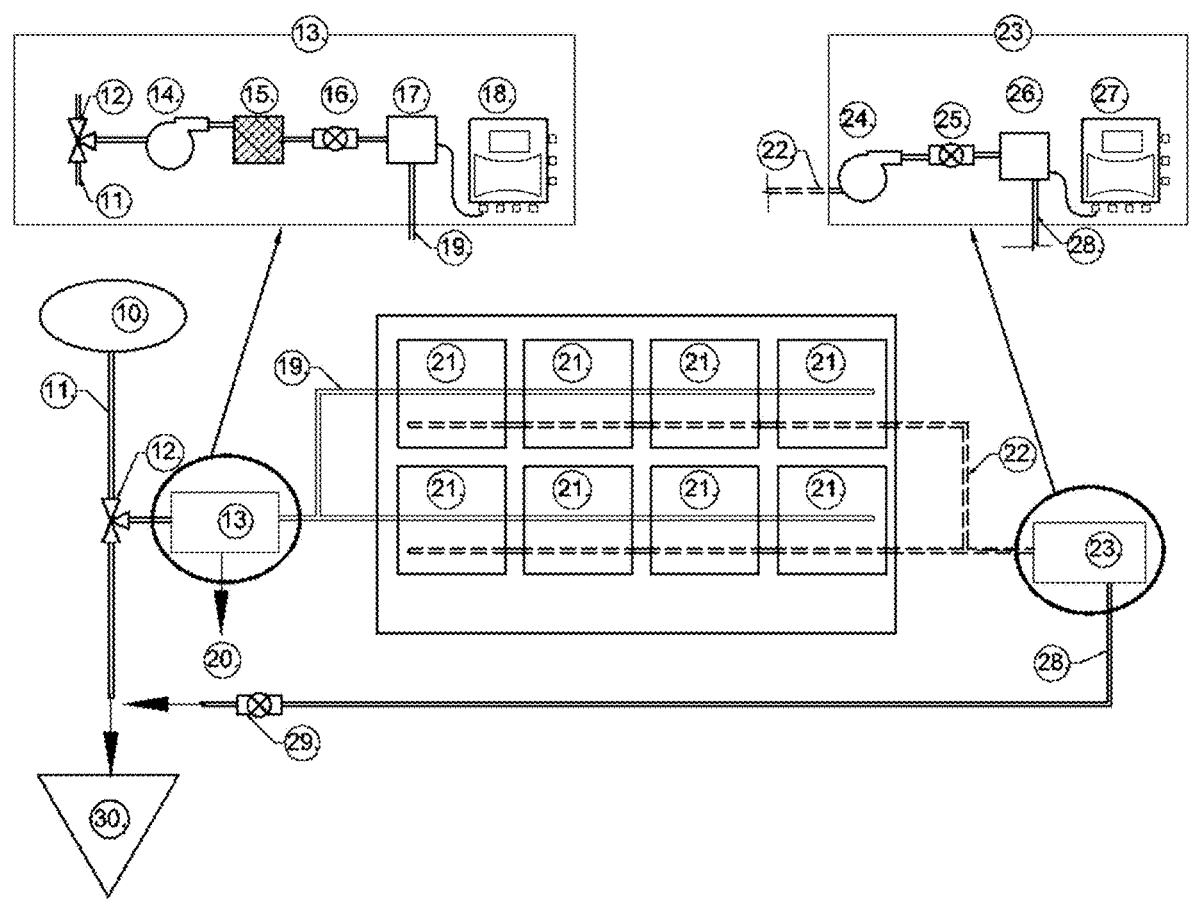
FIG. 1: Schematic shows the system where waste water is pumped, filtered and irrigated through cells then drained and pumped to an outlet.

Photosynthesis captures atmospheric carbon dioxide and creates biomass containing uptake of pollutants.

$6 CO_2 + 6 H_2O \xrightarrow{(sunlight)} 6 CH_2O \text{ (biomass)} + 6 O_2$. In the test cell, a significant microbial reaction is the mineralization of pollutant biomass, which results in pollutant removal. $6CH_2O$ (pollutant biomass)$+6O_2 \xrightarrow{(aerobic\ microbes)} 6CO_2 + 6 H_2O +$ microbial biomass.

Pollutant biomass can be organic carbon from human derived waste or synthetic petrochemicals. This is also the same reaction for plant-derived $CH_2O$ in rhizosphere. The plant-derived $CH_2O$ is more abundant than pollutant biomass secondary effluent water which is 98% treated by current methods; but it is not sufficient for direct NPDES permitted release to public waters of the state. The present invention fills this need as demonstrated below, and at a much lower cost.

Test cells showed containerized pollutant treatment is possible. Early data culminated in the construction and operating details for municipal waste water pollutant treatment by use of poplar and willow roots, contained in a portable bag unit filled with perlite. Perlite, as explained below, is critical to the process to achieve high rates of water input and drainage otherwise not achievable.

Currently, typical small-town environmental-engineered technologies for cleaning wastewater include lagoons, trickle filters, sand filters, submerged attached growth reactors (SAGRs), wetlands and oxidation ditches. These technologies are inefficient, time-consuming and expensive to construct, and are therefore often unable to adequately address the waste needs of agricultural and rural communities. The present invention system addresses many clean up issues utilizing less construction capital, less fossil-fueled power, and uses local operator skills standards, in contrast to existing disinfectant and chemical-fed reactors. This invention also has the advantage of being easier to install and operate, especially for small rural communities, where there are few construction grants, and where tax rates are a sensitive issue for future economic development and new jobs.

In the unitized controllable rhizosphere reactor of the present invention for removing COC in water, a dense root mass grows throughout a perlite filled container. Microbes are grown on plant roots (FIG. 5) to treat regulated pollutants in municipal sewage, industrial waste waters, storm water, or ground water.

The system uses tree root reactors that are proven to remove nitrate and ammonia nitrogen from water. The core unit is dosed (used with) with currently available secondary effluent or lagoon water. The effluent is dosed for a predictable dwell time within the unit rhizosphere as a final treatment process. Dwell time is accomplished by controlling a pump to calibrated irrigation equipment. Drainage water is monitored and discharged to drainage or stream through a National Pollutant Discharge Elimination System (NPDES) permitted discharge.

Water quality achieves a quality standard sufficient for crop and landscape irrigation. It demonstrates that many COC's will be absorbed and mineralized by root-fed microbes and will increase system capacity as roots expand and mature throughout growing media. The unit drainage will be routinely measured and tracked for water quality parameters established in regulated discharge standards. System operation reports are compiled and submitted to regulators as required in permits for oversight. The unit size can range from a single reactor (cell) for treating small isolated water flows to a large array of cells capable of treating waste water from a small community, or selected manufacturing facilities, storm water runoff drainages, hospitals, veterinary clinics and landfills.

The roots add carbon throughout the containment. Because the trees grow, they continue to add subsurface carbon at increasing rates with maturity. The invention system is superior to previous tertiary treatment technologies in effective removal and removal cost.

An advantage of the present invention is space efficiency—it can be a single cell, a row of cells or multiple rows and has lower energy and labor operating costs compared to systems using inert plastic, mineral rock or membrane media. The units can fit within future practices supported by U.S. EPA and U.S. Department of Agriculture programs for nutrient management in small streams often flowing through rural communities.

Treatment capacity of the system begins immediately with root sprouting and increases as plant roots grow, which is an improvement on other mechanical treatment techniques that decrease in capacity as they wear with time. The system also has a high microbe concentration growing as an attached growth connected to dense roots (see FIG. 4 and FIG. 5) that adsorb and mineralize organic compounds including pathogens, pharmaceuticals, hormones, and sewage solids. The system also removes ammonia-N to achieve discharge standard in both the growing season with active photosynthesis and in the tree dormant season where the principle carbon source is stored biomass deposited during the growing season in the cell media. The system is operated with sufficient COC removal capacity even in the dormant season when other treatment options including saturated sand filters, lagoons, wetlands and oxidation ditches are ineffective due to cold weather slowing reactions. The system uses porous perlite media that resists root plugging. Salicaceae family trees can be coppiced for controlled above surface plant height but continued rhizosphere reactions. Media selection with high porosity is essential for water percolation to allow fast filling and rapid drainage. Rapid drainage pulls atmospheric oxygen into the reactor stimulating the aerobic reactions by microbes. Poplar and willow both expand roots through full media volume when planted by a stem pushed through the full media depth.

One advantage of the invention is to greatly reduce fossil energy requirements, compared to current treatments such as aeration that is normally the largest power requirement for public works in rural communities. Conventional technology grow aerobic microbes for aqueous treatment requiring air mixed to saturate waste water to a maximum of 8 parts-per-million oxygen. The present system of the invention changes the aeration mechanism by fluctuation in bag saturation water table by selective dosing and rapid draining effluent though a containment bag. Dosing water, holding the water in the rhizosphere, then draining the water, pulls atmospheric oxygen into the rhizosphere, oscillating the redox potential and stimulating the aerobic microbial reactions. Different pollutant removal reactions dominate aerobic vs. anaerobic/anoxic conditions. Oscillating the redox potential increases unit's treatment applicability to specialty organic petrochemicals, pharmaceuticals, hormones, perfluoroctane sulfonate (PFOS), and pathogens.

A further objective of the present invention is to provide a remote sensing, monitoring, and mechanical control technique that allows off-site or on-site dose and dwell time control. Because many of these targeted small treatment systems are located where on-site operators are both busy and insufficiently trained and licensed for advanced COC treatment, the system can include external communication to off-sight technical support staff to control and monitor performance.

Routine maintenance by trained field staff will maintain sufficient COC removal and can be scheduled based on operating data.

Another advantage of the present invention is to provide a system that fits technically with skills found in small community or industrial organization. The cells are a basic irrigated plant system operable by local staff found in rural or urban settings who can provide routine observation and operation changes. The core reactions are based on an elegant application of agronomic and environmental phenomena that occur in nature. Plants, soils, and agronomic concepts are familiar to farmers and gardeners in small communities contributing to ease of routine maintenance and operating success.

Woody biomass can be removed from the treatment system along with nutrient elements taken up by trees by simple, regular harvest. The biomass can be used for fuel, fiber, compost and bedding.

At the end of the unit's life, the media and roots can be composted if degradation of captured mineral and organic COC's is desired or mandated. Thus, the advantages are apparent.

Looking at FIG. 1, existing secondary waste water treatment effluent (COC water) (10) still has ammonia nitrogen or other organic COC, exceeding discharge concentrations and violates EPA regulations. The COC and water (10) discharges through a pipe (11). Water diverts existing discharge pipe via valve flow control (12) into headworks (13). Headworks components include a secondary effluent pump (14), disk filter (15), control valves (16), filter backwash return line (20), instrumented data sensors (17), communications to computer (18) running an operations algorithm.

Effluent from a point source is mechanically pre-filtered through a disk filter (15) for particle removal before being dosed into the treatment cells. Disk filter back wash (20) is returned back to secondary waste water treatment (10).

Communications (18) connect all measured chemistry data and mechanic system settings to offsite computers. Monitored data and treatment algorithms will make it possible to observe reactor performance and operate reactor by controller which can be controlled by managers located off site and/or on site.

Disk-filtered effluent flows into units (21) through distribution headers (19) to individual discharge sprinkler nozzles (31) based on dosage algorithm. The discharge nozzle (31) is either a drip water irrigation type flow emitter [1] or high-flow irrigation spray nozzle. The dosed water has an engineered dwell time in treatment cell volume for the COC removal reactions to achieve regulated discharge standards.

Figure 2:
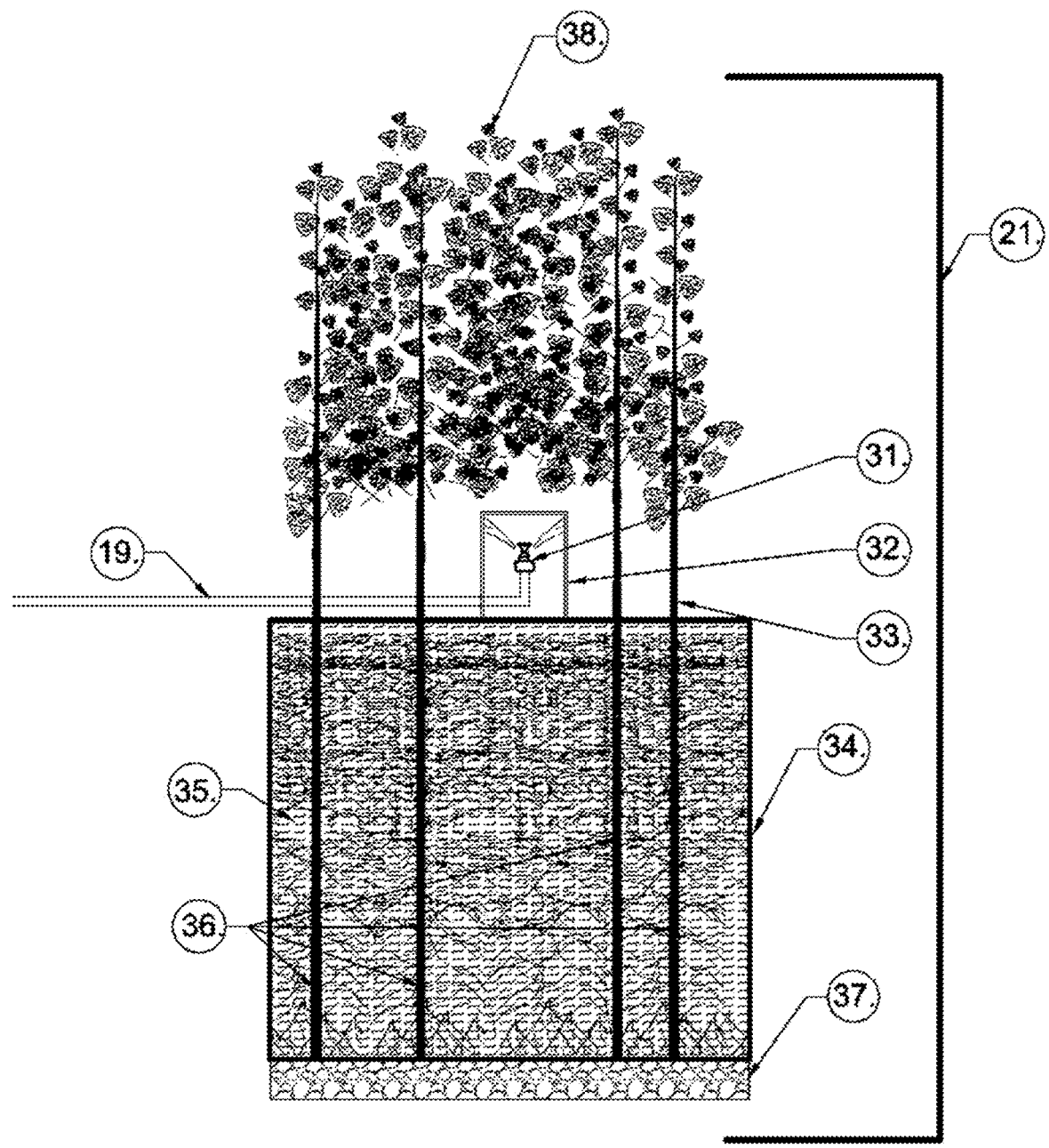
FIG. 2: A schematic of an individual reactor where the rhizosphere grows to provide predictable COC removal capacity, scaled for full-scale system.
Figure 3:
FIG. 3: A photograph of single reactor filled with perlite media, planted with poplar & willow trees designed for microbial reactions fed by root carbon.
Figure 4:
FIG. 4: Photographs shows roots after planting poplar and willow poles where pre-formed root initials sprout and expand roots throughout the entire container volume for intimate COC contact.
Figure 5:
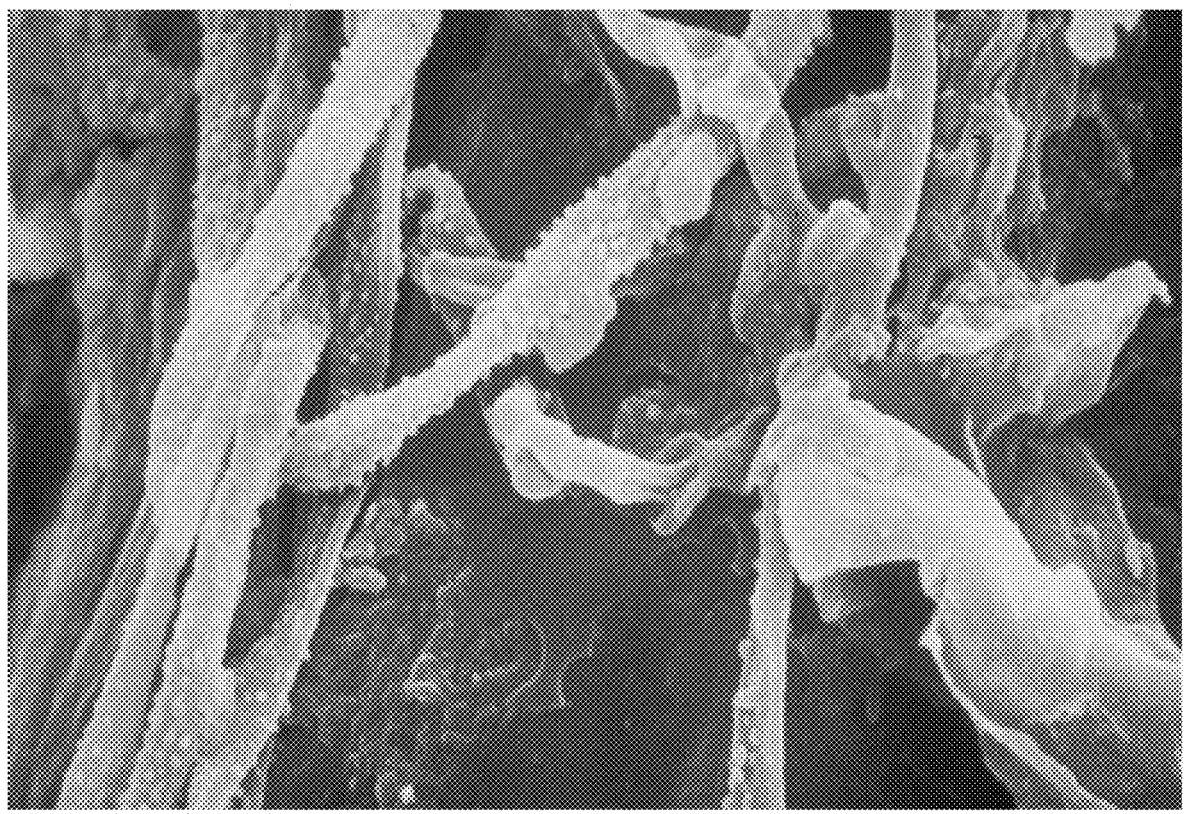
FIG. 5: Shows how root surfaces and interior vascular network grow microbial colonies fed by leaf photosynthesis as a primary carbon source.

Detailed components of the individual cells of the system are shown in FIG. 2 with prototype photographs in FIGS. 3-5. Individual treatment containers (21) are bags (34) filled with a growing media (35). Perlite as a growing medium has offered consistency in early demonstrations. Perlite has a large surface area and provides ease for root expansion. Media blends can also contain sand, agricultural soil, gravel, compost, biochar, activated charcoal, zero-valent iron, and other additives to improve COC removal, but must contain perlite to achieve best drainage results.

FIG. 2 shows a reaction cell (21) where the primary reactions are surface adsorption and microbial mineralization. The cell roots (see FIG. 4) deliver carbon-rich exudates to the reactor subsurface which feed microbes to increase the population and diversity. Subsurface roots grow (36) throughout the compete reactor with a target density>1 root/cm$^3$ media. The trees may be supplemented with other plants to accomplish a defined pollutant removal and/or increase harvested biomass value. Initially for uniform demonstration purposes, the starter plants are all *Populus* spp. and *Salix* spp. trees.

Poplar and/or willow stems (33) are planted using unrooted juvenile stems sufficiently long to reach the cell bottom plus at least 3 growing buds above media (35) surface. These buds develop into new stems with leaves necessary for photosynthesis and exudate supplied to the cell subsurface.

Photosynthesis in the leaves (38) creates the sugars, proteins, and suite of organic molecules shuttled through the phloem to the roots and exuded to the intimate soil. This symbiosis has long-evolved between plants by feeding carbon-rich sap to rhizosphere microbes while the microbes support the plants with symbiotic pathogen defense and nutrient uptake.

Roots (36) create intimate rhizosphere contact with all irrigated COC's distributed by header (19) via sprayer (31). Following intimate contact with media (35) and root surface (36) water drains into a collection sump at drain (22) outlet. Post-treatment water drains (22) to tail works (23) (see FIG. 1). Tailworks (23) includes pump (24), control valve (25), and monitoring instruments (26). Tailworks communications (27) connects all measured chemistry data and mechanic system settings to off-site computers. Following tail works, the treated effluent is pumped through a discharge pipe (28) to existing discharge pipe outlet (30) for NPDES permitted surface water discharge or irrigated on cropped soils.

The system is monitored for flow, pH, ORP, and temperature. All monitoring data will be transmitted to maintain and operate cells. Other instrumentation can be added as needed or required.

When poplar and willow stems are cut, remaining stem stumps will regrow (coppice) so roots will continue to grow and re-establish, releasing exudates and uptaking water and nutrient elements. COC classified as inorganic nutrients include ammonia and nitrate nitrogen, phosphorous, potassium, sulfur, and other essential elements necessary for photosynthesis. These COC's are taken up with groundwater into the root and stored as biomass. Specially, ammonia-nitrogen is adsorbed to the root and media surface where it is taken up by plants for protein growth or nitrified to nitrate nitrogen. Ammonia-N adsorbs in the cell during both the active growing season and dormant season.

COC's classified as organic hydrocarbons such as pharmaceuticals, growth hormones, steroids, oils, explosives and fuels will be adsorbed on organic root surface. Pathogens are sorbed and degraded by competing rhizosphere microbes densely growing on the root surface. Petrochemical and naturally derived organics are removed by adsorption with ongoing secondary metabolism by microbes feeding primarily on root exudates. These compounds include pharmaceuticals, hormones, steroids, proteins, carbohydrates, fuels, solvents, various pesticides, and manufactured organic intermediates.

The tree's pollutant treatment performance can be enhanced by nutrient additives, microbe inoculums, and specific additives that are shown to improve the treatment schedule. When designed for subfreezing winter effluent treatment, cells are configured within a greenhouse or other protective structure to shelter from freezing conditions. Annual tree maintenance cycle includes annual tree harvest with coppiced regrowth and routine replacement of the treatment cell as needed. When operating life of cells is completed, the treatment cell media along with roots and sorbed compounds can be composted. The composted media can be reused for treatment or land-applied for agricultural production or other beneficial use.

In operation data controlled by communications unit is transmitted off-site for monitoring and optional off-site system control. Data is tabulated and prepared for operating decisions for on-site operator and routine maintenance by off-site staff. The treatment algorithm will allow the operator to control effluent flow considering time of year, temperature of media, COC loading rate, reactor age, effluent chemistry, redox potential, oxygen gradient, and other factors in reactor profile. Off-site system control will be fixed by computers onsite, in the office, and by portable handheld devices such as mobile phone or tablet. Treated flow collected in drainpipe under cells (22) located under the drainage layer (37) is immediately available for discharge. Outlet instrumentation in tailworks (23) includes monitored control valves (25), flow meter, pH meter, thermometer, and Oxygen reduction potential (ORP) meter connected to a commercial communication unit (27). Discharged effluent goes through existing, permitted outfall (30) so a new NPDES outlet is not required if effluent irrigation is not allowed. Data is tabulated and prepared for regulatory reporting.

The system is designed to be a tertiary final stage of COC treatment including: ammonia-nitrogen, phosphorus, pathogens, pharmaceuticals, hormones, personal care products, petrochemicals, metals and metalloids. It can supplement an existing lagoon or other inadequate mechanical systems that work sufficiently well in warm weather but fail in October-April, i.e. cold weather.

FIG. 3 shows an actual photograph of a single cell or unit (21), internally filled with roots and root medium (perlite) and with poplar trees (see FIG. 2) with cut poplar stems (33) (coppice) extending from the top. Annual cuttings of the poplar stems increase the root density and entanglement or intertwining with the perlite media (see FIG. 4).

FIG. 5 shows a picture of actual root surfaces and interior vascular network with grown microbial colonies which interact with the biomass pursuant to the reaction earlier illustrated in the specification.

An actual operation of certain constructural features are worthy of specific mention. The container may be a walled structure or a flexible bag. Preferred bag material are nonwoven polymeric sheet materials such as polyalphaolefin, preferably polyethylene and/or polypropylene.

The system uses porous perlite media that resists root plugging. Salicaceae family trees can be coppiced for controlled height but continued rhizosphere reactions. Media selection with high porosity is essential for water percolation to allow fast filling and drainage. Poplar and willow both expand roots through full media volume when planted by a stem pushed through the full media depth.

Preferred sources of the root system have been demonstrated to be trees from the Salicaceae family, particularly preferred are poplar and willow since they are faster growing. It is plausible any member of the family will work with the primary criteria being inexpensive fast-growing trees with fast growing root systems. For further description see the earlier incorporated by reference patents.

The dimensions of the bag (34) can vary. In research referred to below, the bags that were used were 45 inches by 40 inches by 55 inches tall. The perlite packed inside of the bags generally has a dry weight density from about 5 pounds per cubic foot to 9 pounds per cubic foot with a preferred density of 7 pounds per cubic foot. As mentioned previously, perlite is critical to the invention it having been surprisingly discovered that perlite enhances the reaction rate and start up schedule in comparison with any other bulk material. Perlite may also be blended with other materials such as soil medium, etc. The best results shown when there is a minimum of 60% porosity, but best results are achieved with air porosity within the range of 40% to 86% porosity. Medium grade perlite has been most cost effective.

The trees are planted at a density of 24 trees per bag when used in a standard bag. This represents one tree on 81 square inches or 9 inch×9 inch p space. Trees are planted using stem sufficiently long to penetrate the entire perlite volume and have at least two buds exposed above the perlite surface.

The water borne contaminants-of-concern (COC) are irrigated into the rhizosphere media using one or two methods, either drip irrigation or spray irrigation. If desired, sequential treatment by passing post-cell effluent through a second set of multiple bags in serial relationship in order to further enhance contaminate removal. Generally, the waste water is irrigated at a rate between 100 to 300 gallons per day per bag. Influent dosing schedule is designed to achieve an average water dwell time with rhizosphere to achieve COC removal. The average water dwell time for each bag where the rate of water drainage equals the influent flow has been approximately 16 hours, but generally within the range of 10 hours to 7 days.

EXAMPLES

The following examples illustrate the system of the present invention, operated at two different cites (Table I) is a small town cite in the state of Iowa, treating lagoon water in a large bag cell system. Table II is a large city site in the state of Washington.

Example 1

With respect to Table I below. The system was 10 bags (polypropylene) 48 v 48×48" bags, filled with perlite, water from lagoon #3 was pumped, filtered through a 120 mesh disc filter, irrigated through 3 R10 Nelson sprinklers per bag, at a dose rate of 300 gallons per bags, per day. The dose per bag was divided into 20 daily irrigation events of 15 gallons per bag per event. The drainage from the bags was tested, and Table I below represents the average outlet data analysis for 9 different bags, after operation for three (3) growing seasons. Each bag had passed 100,000 gallons of lagoon effluent over the three growing seasons before these samples were taken. The amount of electrical energy required was less than 10% of the amount required for other effective tertiary treatment techniques. The discharge water chemistry as shown achieved all discharge treatment requirement (see permit limit in table) required by the state of Iowa.

TABLE I

| Analyte | Inlet | Outlet | Percent Reduction | Permit Limit |
|---|---|---|---|---|
| E. Coli [MPN]/100 mL* | 1,700 | 260 | 85% | 637 |
| Ammonia (mg/L**) | 0.66 | <0.05*** | >92.5% | 1.1 |
| BOD (mg/L**) | 25 | <2*** | >0.92% | None Listed |
| Nitrate (mg/L**) | 3.8 | 4.0 | No Reduction | None Listed |

Legend
*= Most Probable Number/100 Milliliters
**= Milligrams/Liter
***= Below Quantitative Limit

Example 2

With respect to Table II below. It represents the removal of organic solvents spilled accidentally into subsurface soil and shallow ground water at a manufacturing facility. It was in violation of the ground water standards imposed by the State of Washington. These data represent water dosed in and water drained out of 4 treatment cells, similar to the cells used in Example I. Each cell was planted with 25 Salicaceae tree cuttings throughout the bag, filled with perlite.

The daily dose per bag was 30 gallons/bag/per day. A total of 3500 gallons of ground water with COC were irrigated into the bag before the water samples were collected and analyzed (drainage water). The COC removal demonstrates all regulated ground water pollutant limits for the state of Washington are achieved. This system was less than 10% of the cost required for alternative treatments, and a legal water quality for on-site landscape irrigation was achieved as the data indicates.

TABLE II

| Analyte | Inlet Concentration (ng/L**) | Outlet Concentration (ng/L**) | Percent Reduction | MTCA Limit (ng/L**) |
|---|---|---|---|---|
| Acrylonitrile | 1,000 | 50* | 95.0% | None Listed |
| Vinyl Chloride | 200 | 20* | 90% | 2,000 |
| 1,1-Dichloroethene | 200 | 20* | 90% | None Listed |
| Cis-1,2-Dichloroethene | 200 | 18.9 | 90.5% | 70,000 |
| Trans-1,2-Dichloroethene | 200 | 20* | 90% | 10,000 |
| Trichloroethene | 200 | 20* | 90% | 5,000 |
| Tetrachloroethene | 200 | 20* | 90% | 5,000 |
| 1,1,2,2-Tetrachloroethane | 200 | 20* | 90% | None Listed |
| 1,2-Dichloroethane | 200 | 21.2 | 89.4% | 5,000 |
| Benzene | 31,150 | 20* | 99.9% | 5,000 |
| Toluene | 7,620 | 200* | 97.4% | 1,000,000 |
| Ethylene Dibromide | 200 | 10* | 95.0% | 10 |
| Ethylbenzene | 12,500 | 200* | 98.4% | 700,000 |
| Xylenes | 121,150 | 600* | 99.5% | 10,000,000 |

Legend
*= Non-Detect
**= Nanograms/Liter or Parts Per Trillion

The foregoing examples 1 and 2 demonstrate operability, efficiency of COC water clean-up, and reduced clean-up costs.

What is claimed is:

1. A waste water, scalable and movable phytoremediation cell, comprising an expandable bag container of non-biodegradable material;
   said expandable bag container having an open top, and a bottom with a drain outlet adjacent said expandable bag container bottom;
   said expandable bag container being filled with a mixture of perlite medium and roots of cuttings of the Salicaceae family;
   said expandable bag container being filled with roots from an entire planted Salicaceae stem inserted into the perlite medium from the open top surface to the container bottom;
   said cuttings having stems extending from the roots and protruding from the top of said container.

2. The cell of claim 1 wherein the expandable bag container is a bag comprising a material selected from the group consisting of polyethylene and polypropylene.

3. The cell of claim 2 included in a system that includes a plurality of said bags operating in parallel to achieve a higher capacity.

4. The cell of claim 3 which includes a mechanical disc prefilter through which water with COCs passes before entering any of said bags.

5. The cell of claim 3 which includes a computer to control flow rate, dwell time and effluent temperature.

6. The cell of claim 1 wherein the perlite medium has a dry density within the range of 5 to 9 pounds per cubic foot.

7. The cell of claim 1 wherein the perlite density is about 7 pounds per cubic foot.

8. The cell of claim 1 wherein the perlite medium includes perlite blended with other material selected from the group consisting of soil, gravel, compost, biochar, activated charcoal and zero valent iron.

9. The cell of claim 8 which includes within the perlite medium root nutrients and microbe inoculum.

10. The phytoremediation cell of claim 1 wherein the perlite medium has at least a 60% porosity.

11. The phytoremediation cell of claim 1 wherein the perlite medium has a porosity within the range of 40% to 86%.

12. A method of COC water cleanup comprising;
   collecting COC water;
   passing said collected COC water through a phytoremediation expandable bag container filled with cuttings of the Salicaceae family having stems and roots extending throughout a perlite medium containing said stems and roots to produce a contaminate reduced COC water; and
   collecting the contaminate reduced COC water, which meets clean water standards for pollutant reduction.

13. The method of claim 12 wherein the perlite medium has a dry density within the range of 5 to 9 pounds cubic foot.

14. The method of claim 12 wherein the perlite density is about 7 pounds per cubic foot.

15. The method of claim 12 wherein the perlite medium includes perlite blended with other material selected from the group consisting of soil, gravel, compost, biochar, activated charcoal and zero valent iron.

16. The method of claim 12 which includes within the perlite medium root nutrients and microbe inoculum.

17. The method of claim 12 wherein the perlite medium has at least a 60% porosity.

18. The method of claim 12 wherein the perlite medium has a porosity within the range of 40% to 86%.

* * * * *

UNITED STATES PATENT AND TRADEMARK OFFICE
CERTIFICATE OF CORRECTION

PATENT NO. : 10,865,129 B2
APPLICATION NO. : 16/291321
DATED : December 15, 2020
INVENTOR(S) : Louis A. Licht Page 1 of 1

It is certified that error appears in the above-identified patent and that said Letters Patent is hereby corrected as shown below:

In the Claims

Claim 13, Column 10, Line 43:
INSERT: --per-- after the word pounds and before the word cubic Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*